Patented Dec. 29, 1942

2,306,618

UNITED STATES PATENT OFFICE 2,306,618

TREATMENT OF WINE

Julius H. Fessler, Oakland, Calif., assignor to Pomoeno Products, a partnership composed of Julius H. Fessler and James M. Neil, both of Oakland, Calif., and Harper Allen, Richmond, Calif.

No Drawing. Application March 14, 1939, Serial No. 261,788

12 Claims. (Cl. 99—35)

This invention relates to the treatment of wines and is concerned more particularly with a wine treating process which will increase the tannin content of the wine, and stabilize the wine so that the metallic content will stay in solution and the wine will remain clear after fining.

One principal source of loss to wineries in marketing their wine results from cloudiness caused by metallic precipitates which form after the wine is fined and shipped. With bottled wines a considerable number of bottles are returned because of clouding, and the loss occasioned by such returned bottles has always been considered a necessary evil. When wine is shipped in bulk by tank cars, clouding after shipment makes necessary a treatment of the wine at the destination at the cost of the winery, and the expense involved often amounts to as much as one-third of the price received by the winery. This disadvantageous clouding of wine has been a source of considerable loss to many wineries.

It is well known that the principal cause of cloudiness in wines after bottling is the oxidation of certain metal constituents, principally organic compounds of iron, copper, zinc, tin, lead and the like. The cloudiness is due to the precipitation of such compounds and occurs even in the most carefully fined and filtered wines so that the market value of the same is greatly impaired. Various attempts have been made to obtain satisfactory and permanent stabilization of wines, but to my knowledge the means and methods heretofore proposed either have not proven successful or have not been permissible under the Federal pure food laws. Generally, the methods heretofore employed have attempted to effect precipitation of the metallic compounds, which may include metallic tannates and potassium ferrocyanide and have impaired the body of the wine as well as failing to prevent the precipitation of metallic compounds after bottling. It is known that excess metal may be removed from wine by treatment with potassium ferrocyanide, but the use of this chemical compound is prohibited by State and Federal laws. It has been proposed also to add tannin to wine, but the stabilizing effect of tannin alone is slight and is not permanent and the tannin is added principally for its other effects. As a result, the wine industry has lacked an effective, yet permissible stabilizing process.

I have discovered that the wine can be treated with natural fruit constituents, and preferably grape and wine constituents, to effect perfect clarity throughout the life of the wine, while at the same time increasing the tannin content and improving the body of the wine.

It is a principal object of my invention, therefore, to provide for effective stabilization of wines.

Another principal object of my invention is to provide a process for extracting tannin from the pomace of fruit, such as grapes.

Another object of my invention is to provide a wine treating process which prevents subsequent clouding of the wine due to organic causes after it is prepared.

Another object of my invention is to provide an improved wine treating process which serves to increase the natural tannin content of the wine.

Another object of my invention is to provide an improved wine treating process which will keep the metallic content of the wine in solution.

Another object of my invention is to provide a process for preparing a wine treating agent.

Another object of my invention is to provide a wine treating agent which is effective to stabilize the wine.

Other objects and advantages of my invention will become apparent from the following description thereof.

The stabilizing process of my invention comprises generally the preparation of a treating agent of special character which is added to the wine in appropriate amounts as explained more fully hereinafter, and the nature of the treating agent is such that its presence in the wine cannot be detected except by the improved characteristics obtained in the treated wine. The treating agent is a neutralized fruit product, and is preferably made from wine grapes, although it may be prepared from fruits such as apricots, peaches, plums, apples and the like, the seeds and skins of which provide a source of tannin and colloidal constituents.

As explained above, the treating agent which I preferably employ is a grape product and can be prepared solely from the natural grape and wine constituents. In the particular method and treating agent selected as being exemplary of my invention, a wine treating agent or concentrate is prepared from the pomace of grapes used in making wine, although the particular pomace employed has no relation to the particular wine to be treated, and any wine can be treated with the agent made from any pomace.

The tannin and colloidal constituents are obtained by an alkaline extraction from the pomace in a boiling aqueous solution, and for this purpose, the pomace is placed in a suitable container with a suitable amount of water added and the mixture is brought to a boil. Usually an amount of water weighing approximately nine times the weight of the dry pomace is employed. The mixture of water and pomace may be boiled for from ten to fifteen minutes or it can be brought to a boil and then allowed to stand for from ten to fifteen minutes so as to extract the desired constituents from the seeds and skins of the grape.

At the beginning of, or during the step of extracting the desired constituents from the seeds and skins of the grapes, a suitable neutralizing agent is added to the mixture, preferably before the boiling of the mixture, and any suitable basic salt may be utilized that will substantially neutralize the pomace mixture, such as sodium hydroxide, potassium hydroxide, potassium tartrate, or potassium citrate, for example. In general any soluble basic salt may be used which will not have a deleterious effect on the wine, and which will fall within Government regulatory standards. The mixture may be slightly on the acid side, and good extraction results may be obtained with a pH value as low as pH 6. Generally, the acidity should not be sufficient to cause any precipitation of the flavor content. If desired, an amount of the neutralizing agent may be employed which will make the mixture slightly alkaline, or even definitely basic, although this is considered less desirable because of the deleterious effect of free basic ions on the wine, although as pointed out later the proportion of such free basic ions is so small as to be insignificant. I prefer, however, to use a substantially neutral pomace mixture, and for this purpose, if sodium hydroxide of commercial grade is used, approximately one pound is employed to ten gallons of the treating agent, and corresponding proportions of other basic salts would be used in acordance with their strength as a base.

After the neutralized mixture has set for at least ten to fifteen minutes the liquid can be drained off, although it can be allowed to remain on the seeds and skins for a longer time if desired. The skin and seeds also may be pressed to recover any liquid remaining therein. The liquid thus obtained is concentrated by any suitable means, such as boiling in an open container, and for commercial purposes, it is usually concentrated to about one-third its original volume. This usually provides about a 15% solution of the extract matter. However, if desired, the evaporation of the neutral concentrate can be continued until all of the liquid has been driven off and only the dry extract matter remains. This is preferable where the treating agent will have to be stored for an undetermined length of time until it is required for use. If the treating agent is provided in the form of dry extract, it is dissolved in water to the desired concentration before being used in treating the wine.

The exact chemical structure of the treating agent is not understood, however, a treating agent prepared as described above has a definite catalytic or inhibiting effect when employed with wine as pointed out hereinafter.

The treating agent may be added to the wine at any desired step in the wine making process, either before or after fining, for example. When the neutral concentrate is added to the wine, which is acid, the colloidal content of the concentrate is precipitated. Thus the treating agent acts in part as a fining agent, and with most types of wines no other fining agent is necessary. For this reason it is better to add the agent to the wine before the last filtering operation.

In selecting the amount of treating agent to be used with a particular wine, the character of the wine and the concentration of the treating agent must be considered as well as the tendency of the wine to become cloudy. In one commercial application, for example, one part of a 15% solution of treating agent was employed to 500 parts of the wine.

The exact chemical reactions produced in the wine by the treating agent are not known but the probable action of the treating agent is as a catalyst or an inhibitor which prevents the metallic ions from being oxidized and therefore causes them to remain in solution. It is possible that the treating agent combines with the metallic content of the wine to form a complex soluble ion which is not readily oxidized, so that oxidation will not occur if normal care is exerted to prevent aeration of the wine. In any event, wine treated in the manner described above will not become cloudy, and it has its natural tannin content increased. In addition, the tannin content of the treating agent serves to give a better body to the wine. The wine itself cannot be distinguished from untreated wine by the usually employed chemical analysis, but can be distinguished by its freedom from cloudiness even after storing for long periods.

While I have described my invention in connection with a preferred wine treating method, it will be understood that the invention is capable of both variation and modification. The scope of my invention, therefore, should only be limited by the scope of the claims appended hereto.

I, therefore, claim as my invention:

1. The process of treating wine which comprises making an alkaline extraction of the soluble constituents of the pomace of grapes to prepare a treating agent, and adding the treating agent to the wine to be treated.

2. The process of treating wine which comprises heating a substantially neutral aqueous grape pomace mixture to extract the soluble constituents thereof, separating the resulting liquid from the solid residue to provide a treating agent, and adding the treating agent to the wine to be treated.

3. The process of treating wine which comprises preparing a mixture of grape pomace and water, substantially neutralizing the mixture, heating the mixture to extract the water-soluble constituents of the pomace, recovering the liquid from the mixture, concentrating the liquid to provide a treating agent, and adding the treating agent to the wine to be treated.

4. The process of treating wine which comprises preparing a mixture of grape pomace and water, adding a basic agent to the mixture to provide a minimum pH value of substantially 6, heating the mixture to extract the water-soluble constituents of the pomace, separating and concentrating the liquid of the mixture to provide a treating agent, and adding the treating agent to the wine during the agitation thereof.

5. The process of preparing a wine treating agent which comprises preparing a mixture of grape pomace and water, substantially neutralizing the mixture, heating the mixture to extract the water-soluble constituents of the pomace, recovering the liquid from the mixture, and concentrating the liquid to provide a treating agent.

6. The process of preparing a wine treating agent which comprises preparing a mixture of grape pomace and water, substantially neutralizing the mixture, heating the mixture to extract the water-soluble constituents of the pomace, recovering the liquid from the mixture, and evaporating the liquid to obtain a dry extract.

7. The process of preparing a wine treating agent, which comprises preparing a mixture of grape pomace and water, adding a basic agent to the mixture to provide a minimum pH value of substantially 6, and heating the mixture to extract the water-soluble constituents of the pomace.

8. The process of preparing a wine treating agent of grape pomace which comprises preparing a mixture of water and grape pomace, substantially neutralizing the mixture, heating the mixture for a period of time sufficient to extract the water-soluble constituents of the pomace, and separating the liquid from the solid residue.

9. The process of treating wine which comprises adding to the wine an alkaline extraction of the soluble constituents of the pomace of grapes.

10. The process of treating wine which comprises adding to the wine a pH of at least 6 extraction of the soluble constituents of the pomace of grapes.

11. The process of treating wine which comprises adding to the wine an alkaline extraction of the soluble constituents of the pomace of fruit, the seeds and skins of which provide a source of tannin and colloidal constituents.

12. The process of treating wine which comprises adding to the wine a pH of at least 6 extraction of the soluble constituents of the pomace of fruit, the seeds and skins of which provide a source of tannin and colloidal constituents.

JULIUS H. FESSLER.